F. RIES.
PHONOGRAPHIC STYLUS.
APPLICATION FILED APR. 10, 1916.

1,222,139. Patented Apr. 10, 1917.

Witnesses:

Inventor:
Fred Ries.
by Burton & Burton
his Attys.

UNITED STATES PATENT OFFICE.

FRED RIES, OF CHICAGO, ILLINOIS.

PHONOGRAPHIC STYLUS.

1,222,139.　　　Specification of Letters Patent.　　Patented Apr. 10, 1917.

Application filed April 10, 1916. Serial No. 90,102.

*To all whom it may concern:*

Be it known that I, FRED RIES, a citizen of the United States, residing at Chicago, county of Cook, and State of Illinois, have invented new and useful Improvements in Phonograph-Styli, of which the following is a specification, reference being had to the accompanying drawings, forming a part thereof.

The purpose of this invention is to provide a stylus for transmitting sound vibrations from a phonograph record to the sound-reproducing diaphragm of the phonograph. The material of such a stylus should be quite homogeneous and close grained so that the stylus will vibrate as a whole and be free from secondary internal vibration, and such material should also be adapted to wear well in frictional contact with the material of which phonograph records are commonly made. These qualities I have discovered to a very satisfactory degree in the hard albuminous interior of the seed produced by the phytelephas palm. This palm is found principally in Central and South America and its seeds grow in clusters of six to eight, each seed being of about the size of an Irish potato and consisting principally of a clear liquid which during the development of the seed solidifies into a soft pulp and later into a very hard white form of albumin. If the seeds are gathered at this stage and the slight residue of oil dried out of them, the hard albumin can be worked with cutting and grinding tools about as easily as soapstone. Though there is a slight grain or fiber usually running in the direction of the major axis of the seed the material is quite homogeneous and may be worked up into very small pieces.

Figure 1:
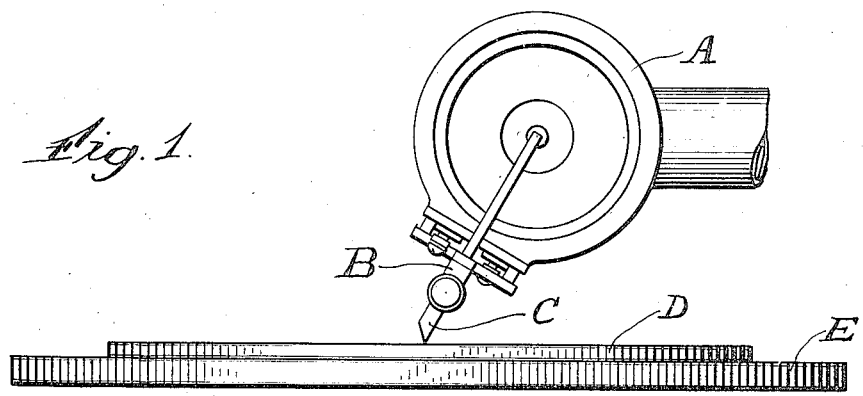
Figure 1 illustrates a preferred form of stylus of this material mounted to coöperate with the phonograph sound box.
Figure 2:
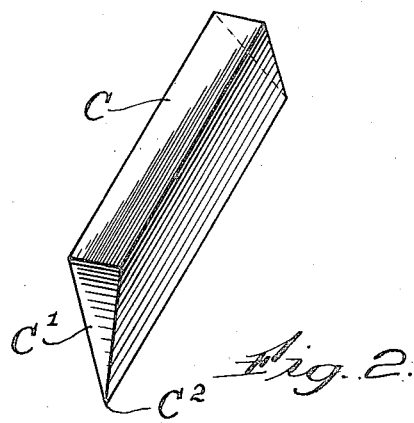
Fig. 2 is an enlarged perspective view of the stylus shown in Fig. 1.
Figure 3:
Fig. 3 is a cross-sectional view of the same.

I prefer to form the stylus of this material as shown in the drawing. In Fig. 1 there is represented a phonograph sound box, A, of conventional design and comprising a holder, B, in which the stylus, C, is removably mounted. In cross section the stylus is triangular, as indicated in Fig. 3, while one end is beveled at $C^1$, to form a comparatively sharp point at $C^2$, for engagement with the phonograph record, D, carried on the rotary table, E. I find that when the stylus is made of the material above described it is sufficiently hard and rigid to efficiently transmit vibration from the face of the record disk, D, to the sound box, while at the same time the material is softer than that of the record, and being very close grained wears away in such a manner as to cause no injury to the record itself. This material is sometimes known as vegetable ivory but differs markedly from animal ivory in that it is much less brittle, so that if injured it does not tend to splinter or fracture in a form which would injure a phonograph record; moreover, the vegetable ivory contains a certain quantity of vegetable oil which serves as a lubricant at the point of contact between the stylus and the record, thus reducing the wear. This wear however is so gradual that a single stylus will satisfactorily play five or six records in succession before becoming too blunt, and at this stage a few strokes of a file over the beveled end, $C^1$, will sharpen it for further service. This material is in commercial use for other purposes and therefore can be readily obtained in open market and at a comparatively low price, thus adding the advantage of cheapness to a stylus manufactured from it.

I claim:—

1. As an article of manufacture, a phonograph stylus having its attenuated portion formed of vegetable ivory.

2. As an article of manufacture, a phonograph stylus formed entirely of vegetable ivory.

In testimony whereof I have hereunto set my hand at Chicago, Illinois, this 6th day of April, 1916.

FRED RIES.